(12) United States Patent
Salter et al.

(10) Patent No.: US 11,603,028 B2
(45) Date of Patent: Mar. 14, 2023

(54) ACCESSORIES FOR VEHICLES WITH REMOVABLE DOORS

(71) Applicant: Ford Global Technologies, LLC, Dearborn, MI (US)

(72) Inventors: Stuart C. Salter, White Lake, MI (US); Amy Lynn Marentic, Plymouth, MI (US); David Brian Glickman, Southfield, MI (US); Annette Lynn Huebner, Highland, MI (US); Paul Jonathan Alexander Wraith, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 274 days.

(21) Appl. No.: 16/868,595

(22) Filed: May 7, 2020

(65) Prior Publication Data
US 2021/0347233 A1   Nov. 11, 2021

(51) Int. Cl.
| | |
|---|---|
| *B60J 5/04* | (2006.01) |
| *B60P 3/39* | (2006.01) |
| *B60P 3/36* | (2006.01) |
| *B60P 3/34* | (2006.01) |
| *B60N 3/00* | (2006.01) |
| *B60R 11/02* | (2006.01) |
| *B60R 11/00* | (2006.01) |

(52) U.S. Cl.
CPC ............... *B60P 3/39* (2013.01); *B60N 3/001* (2013.01); *B60N 3/008* (2013.01); *B60P 3/341* (2013.01); *B60P 3/36* (2013.01); *B60J 5/0413* (2013.01); *B60J 5/0415* (2013.01); *B60R 11/0229* (2013.01); *B60R 2011/0021* (2013.01)

(58) Field of Classification Search
CPC .... B60P 3/36; B60P 3/39; B60P 3/341; B60N 3/001
USPC .................................. 296/159, 164, 161, 162
See application file for complete search history.

(56) References Cited

U.S. PATENT DOCUMENTS

| | | | | |
|---|---|---|---|---|
| 3,737,190 A * | 6/1973 | Smith | ..................... | B60P 3/341 |
| | | | | 135/132 |
| 4,099,534 A * | 7/1978 | Corbin | ..................... | E04H 15/06 |
| | | | | 135/904 |
| 4,396,030 A * | 8/1983 | Ferguson | ................. | E04H 15/06 |
| | | | | 135/88.17 |
| 4,729,594 A * | 3/1988 | Hoff | ......................... | B60P 3/341 |
| | | | | 296/161 |
| 7,097,204 B2 * | 8/2006 | Jessup | ....................... | B60P 3/39 |
| | | | | 5/118 |
| 7,267,384 B1 | 9/2007 | Coviello | | |
| 7,322,637 B2 * | 1/2008 | Smith | ..................... | B60P 3/341 |
| | | | | 296/159 |
| 7,527,318 B2 * | 5/2009 | Geise | ......................... | B60P 3/39 |
| | | | | 296/100.06 |
| 9,475,432 B1 | 10/2016 | Rauschert | | |
| 10,233,664 B2 * | 3/2019 | Choi | ........................ | E04H 15/10 |

(Continued)

*Primary Examiner* — Jason S Morrow
(74) *Attorney, Agent, or Firm* — Vichit Chea; Carlson, Gaskey & Olds, P.C.

(57) ABSTRACT

Various accessories for motor vehicles with removable doors are described herein. In particular, the accessories may be mounted to a motor vehicle when a traditional, or factory, door is removed. Example accessories include covers, grab handles, tube doors, and pieces of furniture, each of which may include one or more lights or other electrically powered devices.

8 Claims, 9 Drawing Sheets

(56) References Cited

U.S. PATENT DOCUMENTS

| | | | | |
|---|---|---|---|---|
| 10,253,521 | B2* | 4/2019 | Choi | E04H 15/32 |
| 10,801,231 | B1* | 10/2020 | Ensign | E04H 15/12 |
| 11,377,017 | B1* | 7/2022 | Yang | B60P 3/39 |
| 2006/0162755 | A1* | 7/2006 | Platek | E04H 15/001 |
| | | | | 296/159 |
| 2010/0088850 | A1 | 4/2010 | Dringenberg | |
| 2014/0083335 | A1* | 3/2014 | Mayhood | E04H 15/06 |
| | | | | 108/18 |
| 2017/0205058 | A1* | 7/2017 | Ostrander | F21V 23/0407 |
| 2018/0297455 | A1 | 10/2018 | Hale et al. | |
| 2019/0118625 | A1 | 4/2019 | Tate | |
| 2019/0275952 | A1 | 9/2019 | Bennett | |
| 2019/0277074 | A1 | 9/2019 | Cherry et al. | |
| 2022/0097593 | A1* | 3/2022 | Backer | E04H 15/06 |

\* cited by examiner

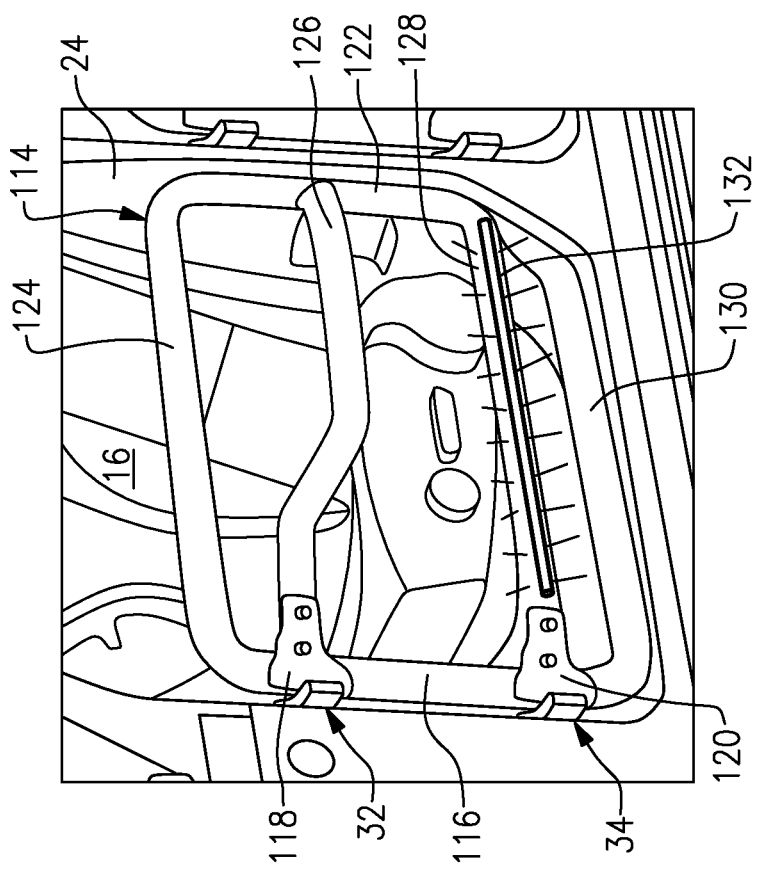
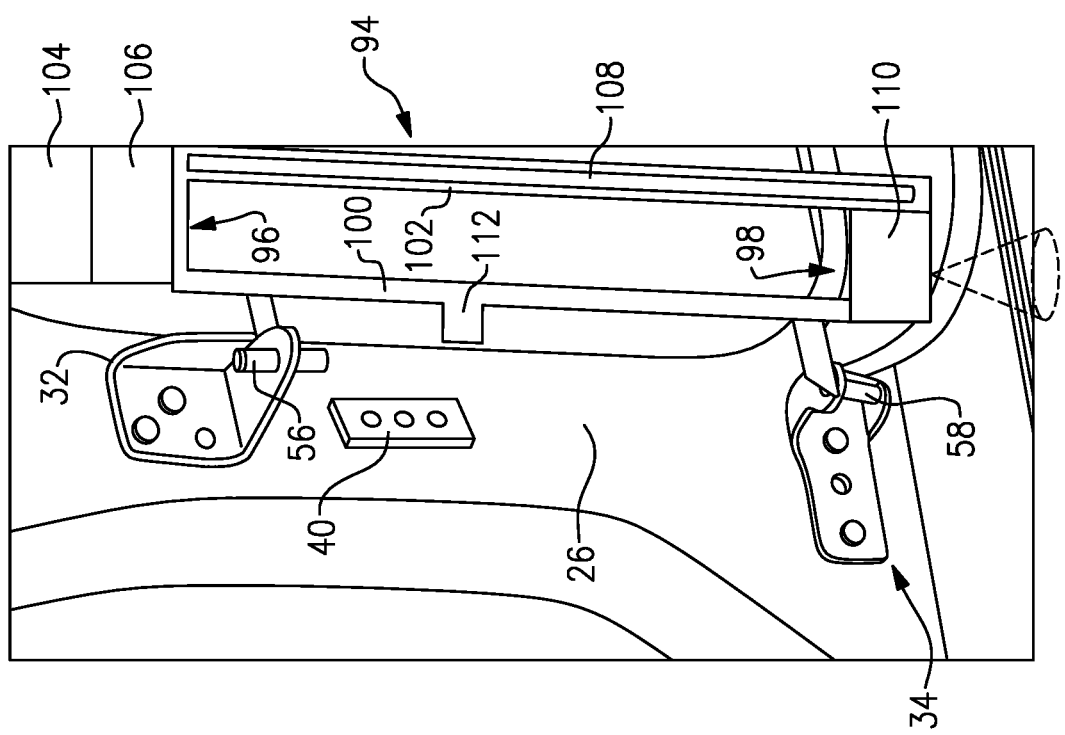
FIG.8
FIG.7

ACCESSORIES FOR VEHICLES WITH REMOVABLE DOORS

TECHNICAL FIELD

This disclosure relates to accessories for motor vehicles with removable doors.

BACKGROUND

Some motor vehicles, such as sport utility vehicles (SUVs), are configured to be used when the traditional, factory doors are removed. Removing the traditional doors may provide users with increased access to the vehicle. Removing the traditional doors may also assist the driver with increased visibility of a ground surface adjacent the vehicle, which may be beneficial in certain situations, such as when driving the vehicle off road.

SUMMARY

An assembly for a motor vehicle according to an exemplary aspect of this disclosure includes, among other things, a first connector configured to connect to a first attachment component on a body of the motor vehicle, a second connector configured to connect to a second attachment component on the body spaced-apart from the first attachment component in a vertical direction, and an accessory connected to the first and second connectors. Further, the accessory includes a light.

In a further non-limiting embodiment of the foregoing assembly, the accessory is a cover covering the first attachment component and the second attachment component.

In a further non-limiting embodiment of any of the foregoing assemblies, the cover also covers an electrical interface on the body.

In a further non-limiting embodiment of any of the foregoing assemblies, the light is a light bar extending in the vertical direction.

In a further non-limiting embodiment of any of the foregoing assemblies, the accessory is a grab handle.

In a further non-limiting embodiment of any of the foregoing assemblies, the grab handle includes a mount for another accessory.

In a further non-limiting embodiment of any of the foregoing assemblies, the grab handle includes a video screen adjacent top surface thereof.

In a further non-limiting embodiment of any of the foregoing assemblies, the light includes a first light extending in the vertical direction along a vertical section of the grab handle.

In a further non-limiting embodiment of any of the foregoing assemblies, the light includes a spot lamp configured such that movement of the grab handle adjusts an aim of the spot lamp.

In a further non-limiting embodiment of any of the foregoing assemblies, the grab handle includes a proximity sensor adjacent a bottom surface thereof.

In a further non-limiting embodiment of any of the foregoing assemblies, the accessory is a tube door having a plurality of tubes and the light mounted to one of the tubes.

In a further non-limiting embodiment of any of the foregoing assemblies, the accessory is a piece of furniture.

In a further non-limiting embodiment of any of the foregoing assemblies, the accessory is a bed.

In a further non-limiting embodiment of any of the foregoing assemblies, the assembly includes a cover at least partially enclosing the bed.

In a further non-limiting embodiment of any of the foregoing assemblies, the light is arranged adjacent a top of the cover.

In a further non-limiting embodiment of any of the foregoing assemblies, the accessory is a table.

An assembly for a motor vehicle according to another aspect of this disclosure includes, among other things, a first connector configured to connect to a first attachment component on a body of the motor vehicle adjacent a door opening of the motor vehicle, a second connector configured to connect to a second attachment component on the body spaced-apart from the first attachment component in a vertical direction, and an accessory connected to the first connector and the second connector. Further, the accessory provides a piece of furniture.

In a further non-limiting embodiment of the foregoing assembly, the piece of furniture is a bed.

In a further non-limiting embodiment of any of the foregoing assemblies, the assembly includes a cover at least partially enclosing the piece of furniture.

An accessory for a motor vehicle according to an exemplary aspect of the present disclosure includes, among other things, a first portion configured to cover at least a portion of a first pillar adjacent a door opening, a second portion at least partially covering a sill adjacent the door opening, a third portion at least partially covering a second pillar adjacent the door opening, and a storage compartment.

BRIEF DESCRIPTION OF THE DRAWINGS

FIG. 7 is a close-up view of the portion of the vehicle with a second accessory mounted to the vehicle.
FIG. 8 is a close-up view of the portion of the vehicle with a third accessory mounted to the vehicle.

DETAILED DESCRIPTION

This disclosure relates to accessories for motor vehicles with removable doors. In particular, the accessories may be mounted to a motor vehicle when a traditional, or factory, door is removed. Example accessories include covers, grab handles, tube doors, and pieces of furniture, each of which may include one or more lights or other electrically powered devices. This disclosure has a number of benefits which will be appreciated from the following description.

Figure 1:
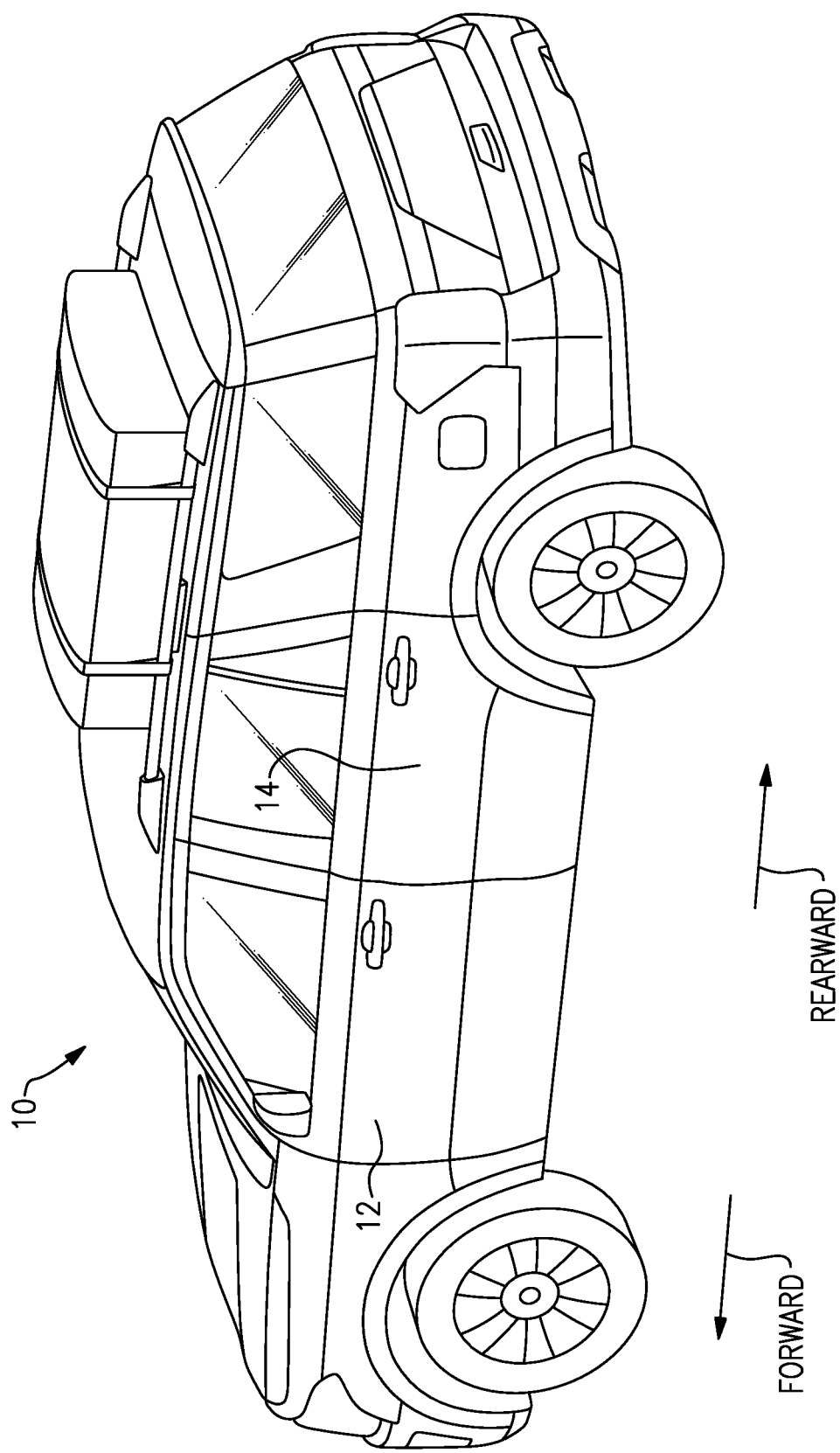
FIG. 1 is a rear perspective view of an example vehicle.

Referring to the drawings, FIG. 1 is a rear-perspective view of a first side, which in countries such as the United States is typically a driver side, of a motor vehicle 10 ("vehicle 10"). As shown, the vehicle 10 is a sport utility vehicle (SUV). While an SUV is pictured, this disclosure is also applicable to other types of vehicles, such as vans and trucks (including pickup trucks). Further, the vehicle 10 could be an electrified vehicle, such as a battery electric vehicle (BEV) or a hybrid electric vehicle (HEV), or another type of vehicle such as a vehicle driven only by an internal combustion engine.

The vehicle 10 includes a first door 12 and a second door 14 rearward of the first door 12. The "forward" and "rearward" directions are labeled in FIG. 1 for ease of reference. When closed, the first and second doors 12, 14, together with a window, are configured to completely enclose a respective door opening. The first and second doors 12, 14 are referred to as traditional doors, herein. Traditional doors are those that are commonly sold standard with a vehicle by a manufacturer, and may be referred to as factory doors.

Figure 2:
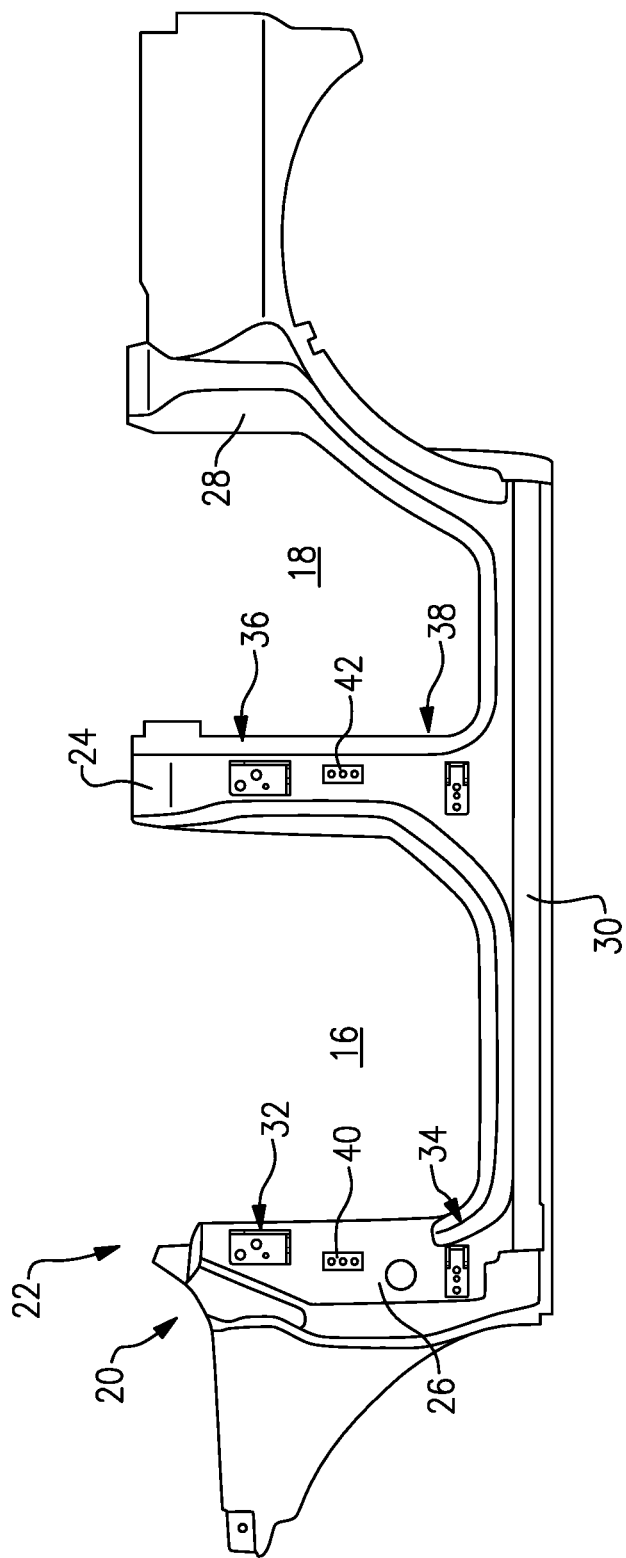
FIG. 2 is a side view of a portion of the vehicle.

The first and second doors 12, 14 are configured to selectively open and close to uncover and cover respective first and second door openings 16, 18 (FIG. 2) formed in the body 20 of the vehicle 10. Specifically, in this example, the first and second doors 12, 14 each include first and second attachment components configured to attach to first and second attachments components on the body 20 of the vehicle 10 to provide a hinge permitting the first and second doors 12, 14 to pivot relative to the first and second door openings 16, 18. While FIGS. 1 and 2 illustrate a first side of the vehicle 10 (e.g., the driver side), it should be understood that the vehicle 10 is substantially symmetrical about its centerline, and that the opposite side (e.g., the passenger side) of the vehicle 10 is arranged similarly, and in particular includes two door openings, each with a corresponding set of attachment components configured to provide hinges. Further, while in FIGS. 1 and 2 there are two doors 12, 14 and two corresponding door openings 16, 18, this disclosure extends to vehicles with one or more doors and door openings on each side of the vehicle.

With reference to FIG. 2, which illustrates a portion of the body 20 of the vehicle 10 without the doors 12, 14, the body 20 includes an A-pillar 22, a B-pillar 24, a hinge pillar 26 (which is sometimes referred to as an A-pillar tower reinforcement), a C-pillar 28, and a sill 30. The sill 30 extends parallel to the forward and rearward directions and provides a bottom of the door openings 16, 18. The A-pillar 22, B-pillar 24, hinge pillar 26, and C-pillar 28 project vertically upward from the sill 30.

The vehicle 10 may include removable side walls, and thus the A-pillar 22, B-pillar 24, and C-pillar 28 are shorter than in vehicles with traditional, fixed side walls. To this end, the A-pillar 22 may only include the hinge pillar 26 in some examples. Regardless, this disclosure extends to vehicles having fixed side walls or removable side walls.

Moving counterclockwise relative to FIG. 2, the first door opening 16 is circumscribed by the A-pillar 22, hinge pillar 26, sill 30, and B-pillar 24. Further, the second door opening 18 is circumscribed by the B-pillar 24, the sill 30, and the C-pillar 28.

The hinge pillar 26 and the B-pillar 24 each include first and second attachment components which are configured to connect to corresponding attachment components of the first and second doors 12, 14 to provide hinge connections. The hinge pillar 26, in this example, includes a first attachment component 32, which is an upper attachment component, and a second attachment component 34 which is lower attachment component vertically spaced-apart below the first attachment component 32. Likewise, the B-pillar 24 includes first and second attachment components 36, 38, which in this example are upper and lower attachment components spaced-apart vertically from one another. As used herein, the vertical direction is generally up and down relative to a ground surface, and is normal to the forward and rearward directions.

In this example, both the hinge pillar 26 and the B-pillar 24 include an electrical interface 40, 42 arranged vertically between respective first and second attachment components 32, 34, 36, 38 on the respective pillar. The electrical interfaces 40, 42 electrically connect the electrically powered components of the doors 12, 14, such as power windows and locks, to various electrical components of the vehicle 10.

In FIG. 2, the doors 12, 14 have been removed from the vehicle 10. A user may choose to remove the doors 12, 14 based on personal preference. In particular, when the vehicle 10 is being used off-road, removing the doors 12, 14 can provide better access and visibility for the driver. Removing the doors 12, 14 typically includes removing a hinge pin or similar connector from between the attachment components 32, 34, 36, 38 and a corresponding attachment component on the doors 12, 14. In this disclosure, one or more accessories may be attached to the attachment components 32, 34, 36, 38 when the doors 12, 14 are removed. The accessories provide a number of different functions and benefits other than those provided by traditional doors. Here, the term accessory is used to refer to a structure or collection of structures mountable to the vehicle 10 via the attachment components on the body 20 of the vehicle 10 other than traditional doors, such as the doors 12, 14. The term accessory is not used herein as a replacement for the term "means." This disclosure includes a number of accessories that may be attached to attachment components 32, 34, 36, 38 and/or the electrical interfaces 40, 42. The accessories provide various benefits which will be appreciated from the below description.

Figure 4:
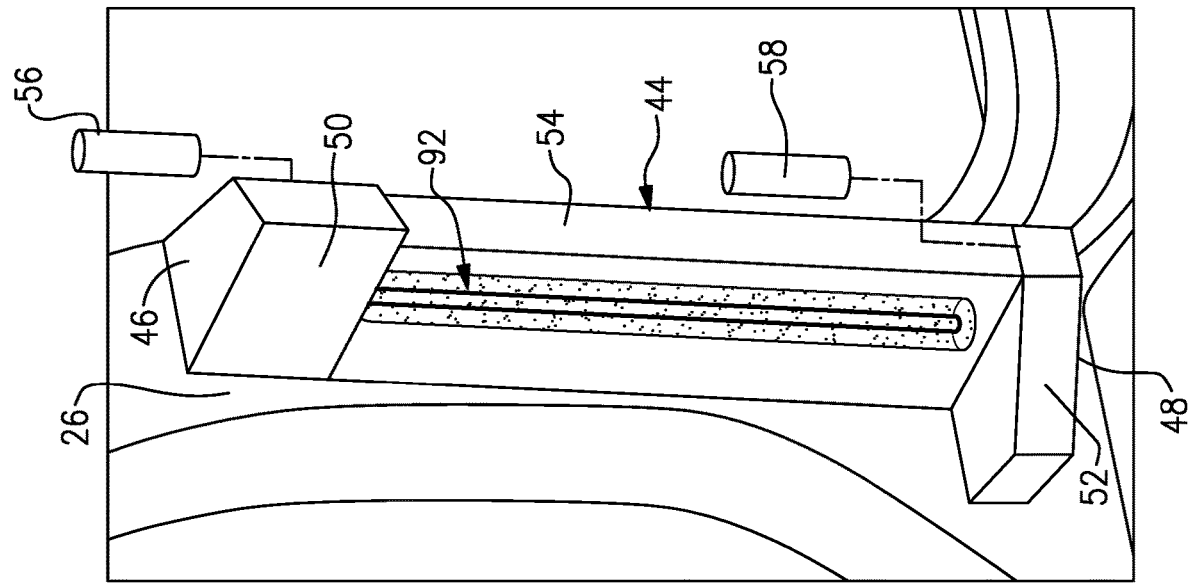
FIG. 4 is a close-up view of the portion of the vehicle with a first accessory mounted to the vehicle.
Figure 3:
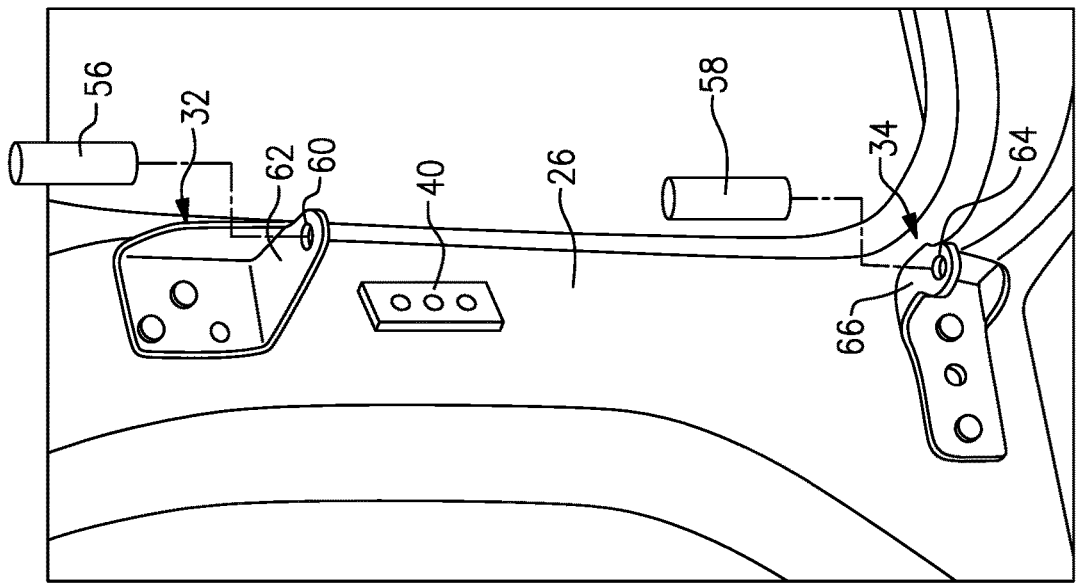
FIG. 3 is a close-up view of the portion of the vehicle.

FIG. 3 is a close-up view of the hinge pillar 26, and in particular illustrates the first and second attachment components 32, 34 and the electrical interface 40. FIG. 4 illustrates a first example accessory, which in this example is a cover 44, mounted relative to the hinge pillar 26. It should be understood that a similar accessory or another accessory may be mounted relative to the B-pillar 24.

The cover 44 is configured to cover and protect the first and second attachment components 32, 34 and the electrical interface 40 when the door 12 is removed from the vehicle 10. The cover 44 may be made of a plastic or a metallic material, as examples. The cover may be transparent, translucent, or opaque. In the example where the cover is opaque, the cover 44 obscures a view of the first and second attachment components 32, 34 and the electrical interface 40 from an exterior perspective. The cover 44, in this example, is generally concave from the perspective of the hinge pillar 26. The cover 44 protects the first and second attachment components 32, 34 and the electrical interface 40 from exposure to dirt, for example.

The cover 44 has a length extending in the vertical direction between a first end 46 and a second end 48. Adjacent the first end 46, the cover 44 includes a first pocket 50, which is concave when viewed from the perspective of the hinge pillar 26. The first attachment component 32 is configured to fit in the first pocket 50. The cover 44 further includes a second pocket 52, which is also concave when viewed from the perspective of the hinge pillar 26, and the second attachment component 34 is configured to fit in the second pocket 52. The cover 44 further includes a main section 54 extending between the first and second pockets 50, 52. The main section 54 covers the electrical interface 40. The leading, or forward-facing, surface of the main section 54 may be angled such that the leading surface tapers toward the body of the vehicle 10 moving in the forward direction, which improves aerodynamics.

The cover 44, in this example, is mechanically and electrically connected to the vehicle 10. Specifically, first and second connectors 56, 58 are configured to connect the cover 44 to the first and second attachment components 32, 34, respectively. The first connector 56 is configured to connect the cover 44 to the first attachment component 32 via an opening 60 in an outwardly-projecting tab 62 of the first attachment component 32, and the second connector 58 is configured to connect the cover 44 to the second attachment component 34 via an opening 64 in an outwardly-projecting tab 66 of the second attachment component 34. The first and second connectors 56, 58 are illustrated schematically in FIGS. 3 and 4. The first and second connectors 56, 58 may be any type of known mechanical connector. In particular, the first and second connectors 56, 58 may be provided by fasteners or connectors that are selectively releasable when operated by hand, without any tools.

Figure 5:
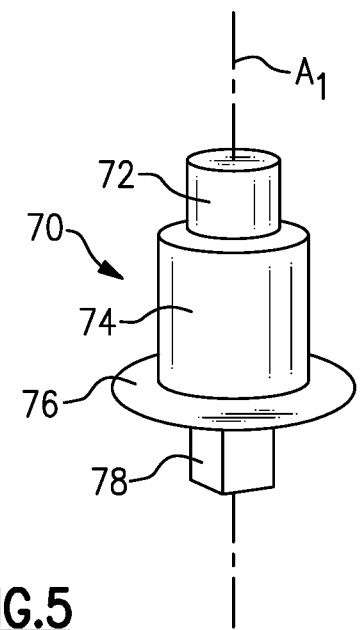
FIG. 5 illustrates a first example connector.

FIG. 5 illustrates an example connector 70. Beginning at a first axial end of the connector 70, the connector 70 includes a plunger 72 selectively moveable along the central axis $A_1$ of the connector 70 relative to a barrel 74. The barrel 74 is connected to a flange 76. On an opposite side of the flange 76 as the barrel 74, the connector 70 includes an expandable pin 78, which may be a square pin, and is selectively expandable in a direction normal to the axis $A_1$. The expandable pin 78 retracts when the plunger 72 is pressed into the barrel 74, for example. The plunger 72 is biased into a neutral, or resting, position by a biasing member, such as a spring, which holds the expandable pin 78 in the expanded position.

The connector 70 may be used as either the first or second connector 56, 58. When used as the first connector 56, the plunger 72 is pressed to retract the expandable pin 78 and the expandable pin 78 is inserted into the opening 60. The plunger 72 is then released, and the tab 62 fits securely between the flange 76, which rests against a top surface of the tab 62, and the expandable pin 78, which is expanded and contacts a bottom surface of the tab 62.

Figure 6:
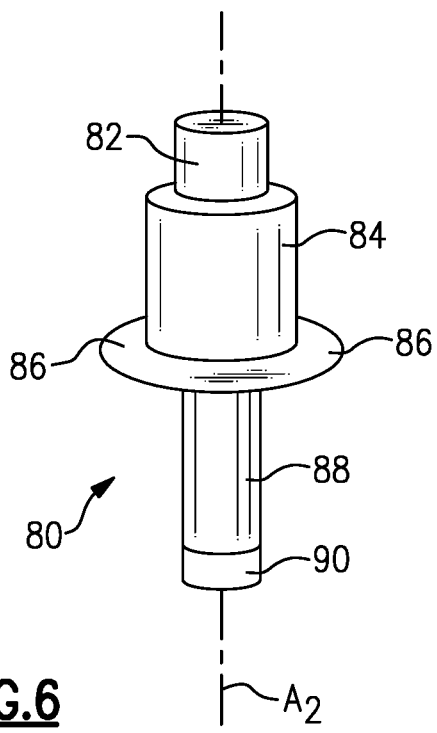
FIG. 6 illustrates a second example connector.

FIG. 6 illustrates another example connector 80. Beginning at a first axial end, the connector 80 extends along a central axis $A_2$ and includes a fixed pin 82, a barrel 84, a flange 86, another fixed pin 88, and a tip 90, such as a rubber tip. The tip 90 provides a second axial end of the connector 80. The connector 80 does not include any selectively expandable components in this example. The connector 80 may be used as either of the first or second connectors 56, 58. In an example, the first connector 56 is provided by the connector 70 and the second connector is provided by the connector 80.

With reference back to FIG. 3, the cover 44 also includes a light 92. In an example, the light 92 is a strip of light emitting diodes (LEDs) including one or more LEDs arranged in a line extending in the vertical direction. The light 92 may be provided by an LED light bar, in an example. The light 92 is electrically connected to the vehicle 10 via the electrical interface 40, in this example. The vehicle 10, either in response to an input from a user or automatically, may power and control one or more aspects of the light 92, including its intensity, color, and whether it is activated. The light 92 may provide a running light or signature lighting for the vehicle 10. While a light is shown, the cover 44 could include one or more additional electrically powered devices.

Another example accessory is illustrated relative to the hinge pillar 26 in FIG. 7. In particular, FIG. 7 illustrates a grab handle 94, which is attachable to the first and second attachment components 32, 34 in place of a traditional door. The grab handle 94, in this example, is provided by a closed loop including a horizontally-extending top section 96 and a horizontally-extending bottom section 98 spaced vertically apart from one another by first and second vertical sections 100, 102. The grab handle 94 is rotatably connected to the first and second attachment components 32, 34 by first and second connectors 56, 58, which may be the provided by the connectors 70, 80 or other connectors.

The grab handle 94 is configured to rotate relative to the first and second attachment components 32, 34 between an open position and a closed position. When in the closed position, the grab handle 94 is held in place adjacent the door opening 16. The grab handle 94 is sized such that the grab handle 94 does not project significantly into the door opening 16. In particular, when the grab handle 94 is closed, a user can still enter and exit the vehicle 10 without interference from the grab handle 94. A user may grab a portion of the grab handle 94 to assist the user entering and/or exiting the vehicle 10. The grab handle 94 may be secured in the closed and/or open positions by one or more fasteners, connectors, or tethers. In another example, the grab handle 94 is rigidly connected to the first and second attachment components 32, 34 such that the grab handle 94 is not configured to rotate between open and closed positions.

The grab handle 94 includes one or more electrically powered devices connected via wire harness, for example, to the electrical interface 40. In particular, in this example, the grab handle 94 includes a plurality of electrically powered devices. Specifically, a video screen 104 is mounted to the top section 96. The video screen 104 faces an interior of the vehicle 10 such that the driver, for example, can view the video screen 104. The video screen 104 may be a touch screen. Further, a spot lamp 106 is mounted to the top section 96 and faces the exterior of the vehicle 10. The spot lamp 106 may be aimed by a user by rotating the grab handle 94. The second vertical section 102, in this example, includes a light 108, which in this example is an LED light bar similar to the light 92 of FIG. 3. The light 108 extends along the entire length of the second vertical section 102 and provides a running light or a signature light. A sensor 110 is mounted to the bottom section 98. The sensor 110 is aimed downward, toward a ground surface, and may be provided by any known type of proximity sensor, such as an ultrasonic sensor. The sensor 110 may generate a signal which is indicative of a distance between the sensor 110 and a ground surface. The signal from the sensor 110 may be interpreted by a controller of the vehicle 10 to determine whether the vehicle 10 is traveling over uneven terrain, such as rock formations, and/or water.

Additional electrically powered devices may be mounted to the grab handle 94. In particular, the grab handle 94 includes a mounting tab 112 along the first vertical section 100. The mounting tab 112 is configured to support one or more electrically powered devices such as a camera, as an example.

FIG. 8 illustrates another example accessory, which is a tube door 114, configured to rotatably connect to the first and second attachment components 32, 34 to selectively open and close relative to the door opening 16. In this example, the tube door 114 includes a first vertical section 116 including first and second attachment components 118, 120 configured to rotatably connect to the first and second attachment components 32, 34. The tube door 114 further includes a second vertical section 122 configured to interface with a striker pin on the B-pillar 24. The tube door 114, in this example, includes four horizontal sections 124, 126, 128, 130 extending horizontally (e.g., in the forward and rearward directions) between the first and second vertical sections 116, 122, but this disclosure extends to tube doors with a different number of the horizontal sections. Each section 116, 122, 124, 126, 128, 130 of the tube door 114 is provided by a substantially hollow metallic structure, in this example. Further, the horizontal sections 124, 126, 128, 130 are vertically spaced-apart from one another to permit visibility through the tube door 114.

In this disclosure, a light 132 is incorporated into the horizontal section 128. The light 132 may be an LED light bar similar to lights 92, 108, and the light 132 may provide a running light or signature light. The light 132 may be connected to an electrical interface, namely the electrical interface 40 (not shown in FIG. 8). The light 132 may extend a majority of the length of the horizontal section 128. Other horizontal sections may include a light. The light 132 is on an outer side of the horizontal section 128. The light 132, in other examples, is incorporated into a bottom of a horizontal section. While the light 132 faces the exterior of the vehicle 10, the light 132 could face the interior of the vehicle 10 and illuminate a portion of the passenger cabin.

In another aspect of this disclosure, a piece of furniture is attached to the vehicle via one or more of the attachment components. Example pieces of furniture include a bed, table, and/or a shelf. Attachment of such accessories makes the vehicle 10 particularly useful during activities such as camping and/or tailgating, as examples.

Figure 9:
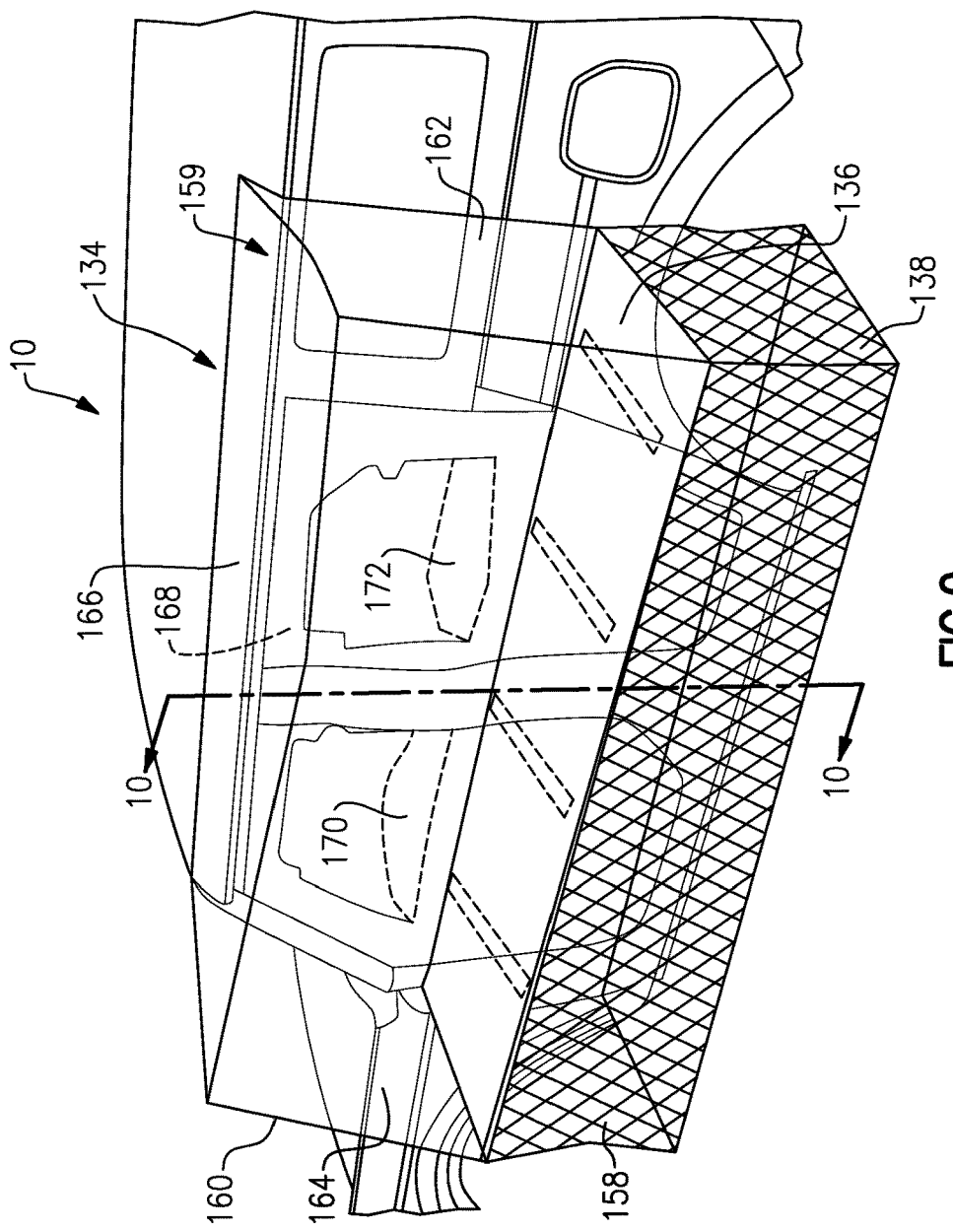
FIG. 9 is a rear perspective view of the vehicle with a fourth accessory mounted to the vehicle.

With reference to FIG. 9, an example piece of furniture 134 is attached to the first side of the vehicle 10. In this example, the piece of furniture 134 includes a first substantially flat surface 136 extending horizontally from the vehicle 10, substantially parallel to a ground surface, that may function as a table, shelf, or a bed. In this regard, the first substantially flat surface 136 has a length extending parallel to the forward and rearward directions by a distance substantially equal to that of a standard sleeping surface. The first substantially flat surface 136 has a width normal to its length sized to accommodate a user that is sleeping on the first substantially flat surface 136. The piece of furniture 134, in this example, further includes a second substantially flat surface 138 vertically beneath the first substantially flat surface 136. The second substantially flat surface 138 may provide another bed, table, and/or a storage area such as shelf.

Figure 10:
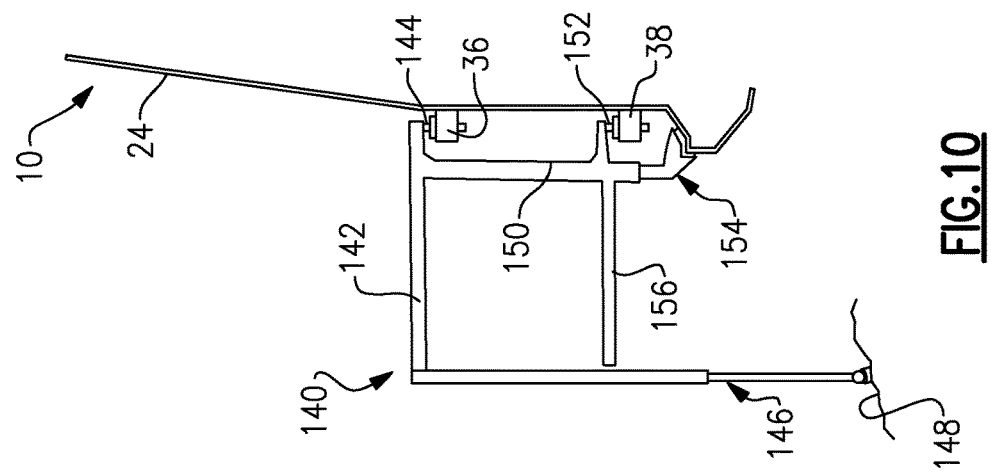
FIG. 10 is a rear view of an example support for the fourth accessory.

The first and second substantially flat surfaces 136, 138 are supported by one or more support assemblies attached to the vehicle 10. FIG. 10 illustrates a first example support assembly 140. The support assembly 140 is attached to the attachment components 36, 38 of the B-pillar 24. The support assembly 140 includes an upper support 142 projecting horizontally outward from the B-pillar 24. Adjacent the B-pillar 24, the upper support 142 is connected to a connector 144 configured to connect to the first attachment component 36. Opposite the B-pillar, the upper support 142 is connected to a vertical support 146, which in one example is configured to telescope vertically to contact a ground surface 148. The telescopic aspect of the vertical support 146 accounts for uneven ground surfaces.

The upper support 142 is also anchored below the first attachment component 36 via a vertical support bar 150, which is attached to the second attachment component 38 via a connector 152. The vertical support bar 150 includes a bottom section 154, in this example, which is configured to abut a body of the vehicle 10 and further resist rotation of the support assembly 140 brought about by loads applied onto the piece of furniture 134. A lower support 156 extends horizontally from the vertical support bar 150, in this example, and extends in a direction parallel to the upper support 142. The connectors 144, 152 may be provided by the connectors 70, 80 or another type of connector.

The support assembly 140 is exemplary. Other types of support assemblies may support the piece of furniture 134. In the example of FIG. 10, the upper support 142 may directly contact and support the first substantially flat surface 136, and the lower support 156 may directly contact and support the second substantially flat surface 138. Alternatively or additionally, the second substantially flat surface 138 may hang from the first substantially flat surface 136 via netting 158 (FIG. 9).

A plurality of support assemblies substantially similar to the support assembly 140 may be arranged along the length of the piece of furniture 134. In a particular example, another support assembly substantially similar to the support assembly 140 is attached to the hinge pillar, and another support assembly is attached to the C-pillar.

When the first substantially flat surface 136 is used as a bed, the piece of furniture 134 may include a cover, or canopy, which, together with the bed, provides a tent or similar sleeping enclosure. An example cover 159, which at least partially encloses the first substantially flat surface 136, is illustrated in FIG. 9. The cover 159 is illustrated as being transparent, but the cover 159 may be partially or fully opaque. The cover 159 includes at least front and rear surfaces 160, 162, an outer surface 164, and an upper surface 166. The front, rear, and upper surfaces 160, 162, 166 are attached to an exterior of the vehicle 10 via a known type of connection, such as magnets or clasps. The cover 159 may also include an inner surface 168 adjacent the body of the vehicle 10. The inner surface 168 may include one or more zippered openings permitting entrance into the cover 159 from the passenger cabin of the vehicle 10. In this example, the inner surface 168 includes a first zippered opening 170 configured to permit access into the cover 159 from the door opening 16 and a second zippered opening 172 configured to permit access into the cover 159 from the door opening 18. Zippered openings may be provided in other parts of the cover 159.

Figure 11:
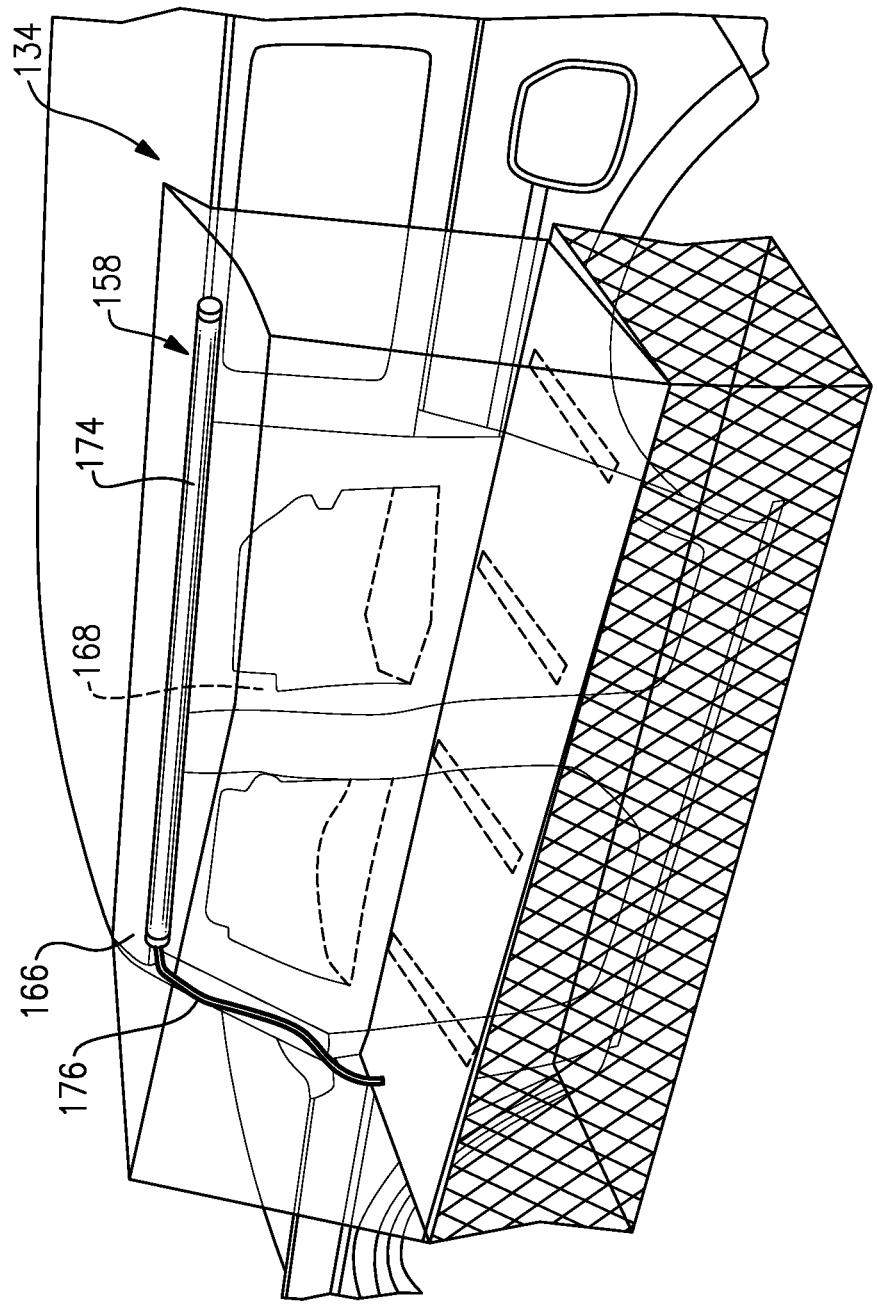
FIG. 11 is a rear perspective view of the vehicle with the fourth accessory mounted to the vehicle, and in particular illustrates an example light configured for use with the fourth accessory.

FIG. 11 illustrates another aspect of the piece of furniture 134. In FIG. 11, a light 174 is arranged in the interior of the cover 159 and is supported adjacent the intersection between the upper surface 166 and the inner surface 168. The light 174 is electrically connected to the electrical interface 40, in this example, via a harness 176. The light 174 may be used to selectively illuminate the interior of the cover 159. Further, the light 174 may be used without the cover 159, and in particular may be useful in illuminating the piece of furniture 134 when the substantially flat upper surface 136 is used as a table, such as for working or eating a meal in low light conditions.

Figure 12:
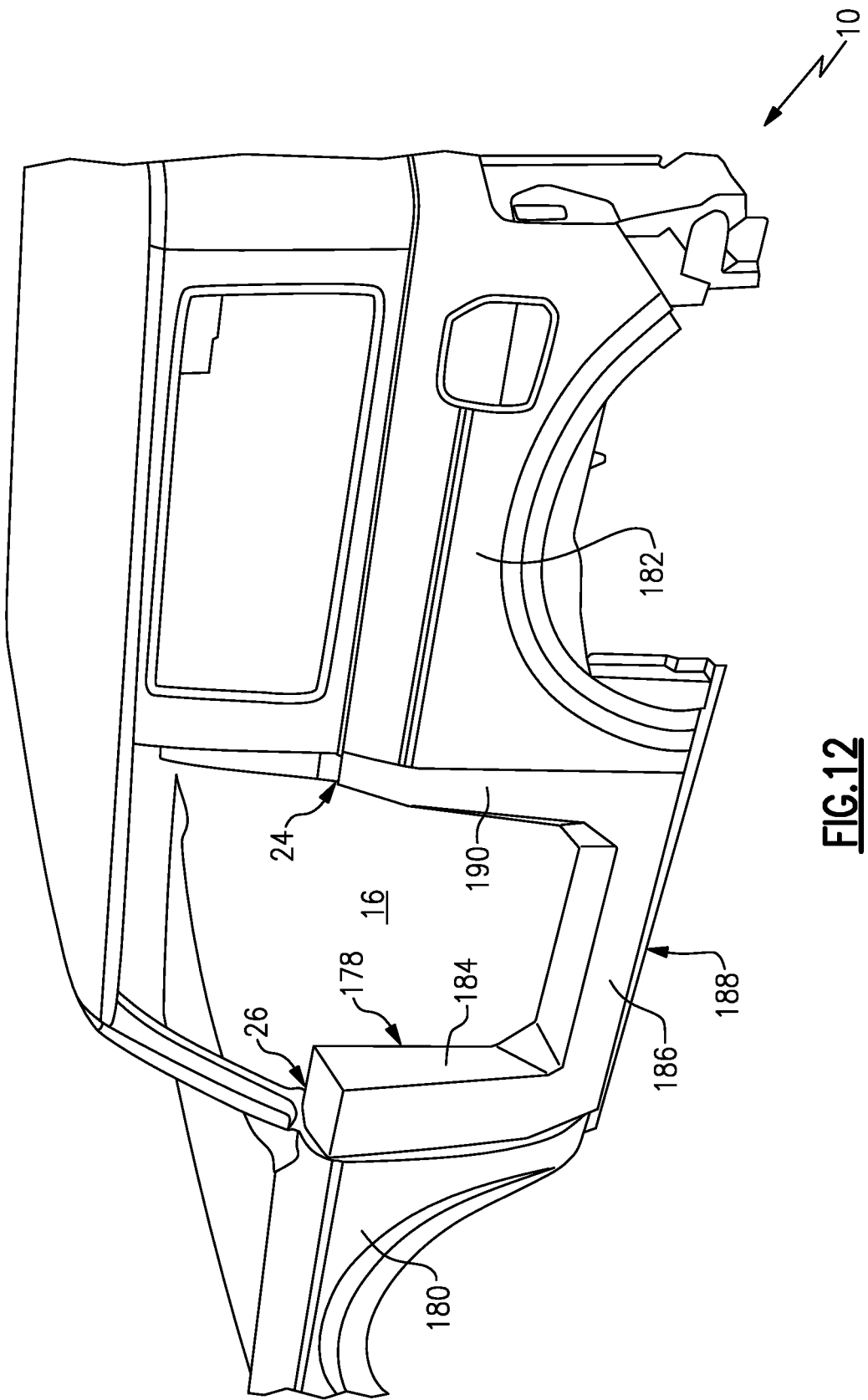
FIG. 12 is a rear perspective view of the vehicle with a fifth accessory mounted to the vehicle.

FIG. 12 illustrates another accessory according to this disclosure. In the embodiment of FIG. 12, there is only a single door opening 16 on the first side of the vehicle 10. When a traditional door is removed, the accessory 178, which may be referred to as a cover, is configured to cover the mechanical and electrical connections left exposed adjacent the hinge pillar 26 and B-pillar 24.

Further, the exterior surface of the accessory 178 is configured to sit flush (i.e., substantially parallel to) a front quarter panel 180 and a rear quarter panel 182 of the vehicle 10, in this example. The accessory 178 includes a first portion 184 extending vertically and configured to cover at least a portion of the hinge pillar 26, namely the first attachment component 32, the second attachment component 34, and the electrical interface 40. The accessory 178 further includes a second portion 186 extending horizontally from a bottom of the first portion 184 and at least partially covering a sill 188 adjacent the door opening 16. Finally, the accessory 178 includes a third portion 190 extending vertically from a rear of the second portion 186 and at least partially covering a the B-pillar 24, including covering a striker pin if present. The accessory 178 provides a finished look to the vehicle 10 adjacent the door opening 16 when the traditional door is removed. From an exterior perspective, the accessory 178 is seamless. In particular, there are no joints or seams at the intersections between the first portion 184, the second portion 186, or the third portion 190.

Figure 13:
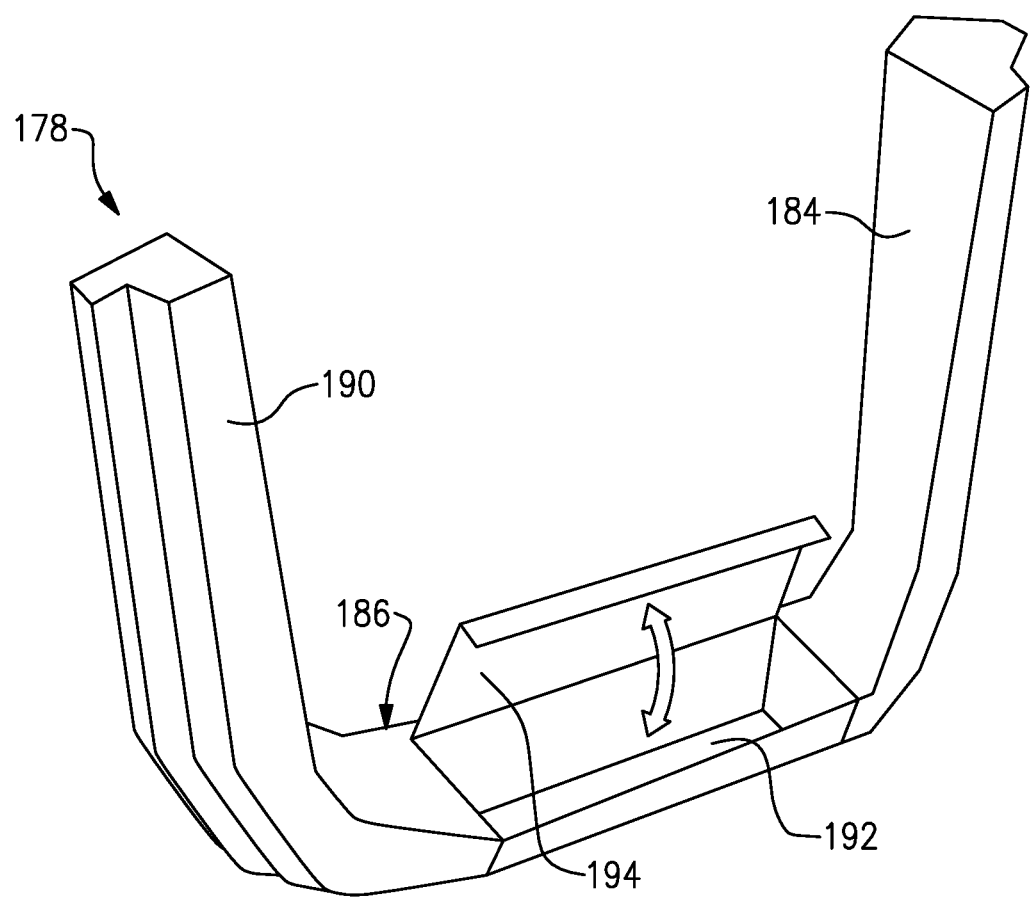
FIG. 13 is a perspective view of the fifth accessory, and in particular illustrates an example storage compartment of the fifth accessory.

In a further aspect of this disclosure, the accessory 178 incorporates a storage compartment. An example storage compartment 192 is shown in FIG. 13. The storage compartment 192 is arranged beneath a selectively moveable door 194, which, when closed, provides a top surface of the second portion 186. The door 194 is lockable in an example. The accessory 178 could also include an electrically powered device, such as a light.

Directional terms such as "vertical," "upward," "downward," "forward," "rearward," "horizontal," "top," "bottom," etc., are used herein for purposes of explanation and with reference to the orientation of components illustrated in the drawings. Such directional terms should not be considered limiting. Further, it should be understood that terms such as "generally," "substantially," and "about" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. An assembly for a motor vehicle, comprising:
a first connector configured to connect to a first attachment component on a pillar of a body of the motor vehicle, wherein the pillar partially circumscribes a door opening of the motor vehicle;
a second connector configured to connect to a second attachment component on the pillar spaced-apart from the first attachment component in a vertical direction; and
an accessory connected to the first and second connectors, wherein the accessory includes a light, and wherein the accessory provides a table or bed.

2. An assembly for a motor vehicle, comprising:
a first connector configured to connect to a first attachment component on a body of the motor vehicle adjacent a door opening of the motor vehicle;
a second connector configured to connect to a second attachment component on the body spaced-apart from the first attachment component in a vertical direction; and
an accessory connected to the first connector and the second connector, wherein the accessory provides a piece of furniture on an outside of the motor vehicle.

3. The assembly as recited in claim 2, wherein the piece of furniture is a bed.

4. The assembly as recited in claim 3, further comprising a cover at least partially enclosing the piece of furniture, wherein the cover is at least partially on the outside of the motor vehicle.

5. The assembly as recited in claim 1, wherein the accessory is on an outside of the motor vehicle.

6. The assembly as recited in claim 1, wherein the first attachment component and the second attachment component are configured to connect to a removable door of the motor vehicle.

7. The assembly as recited in claim 2, wherein:
the first attachment component is on a pillar of the body, the pillar partially circumscribes the door opening, and the second attachment component is on the pillar.

8. The assembly as recited in claim 7, wherein, adjacent a side of the piece of furniture opposite the pillar, a height-adjustable vertical support is configured to telescope vertically relative to the piece of furniture to contact a ground surface.

* * * * *